Oct. 16, 1928.
J. CLARK
1,688,176
CONNECTER
Filed July 11, 1927   2 Sheets-Sheet 1
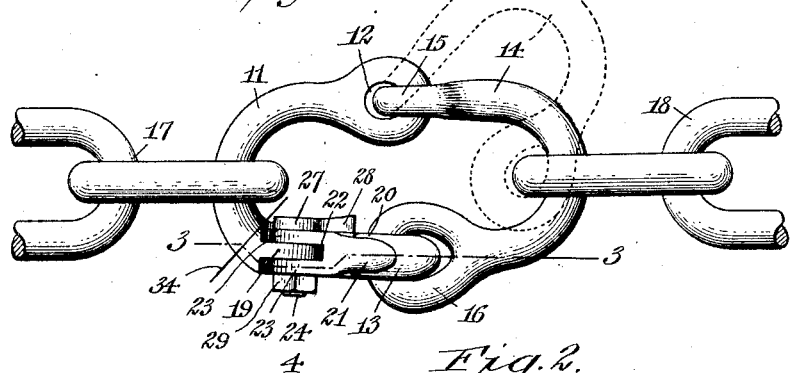
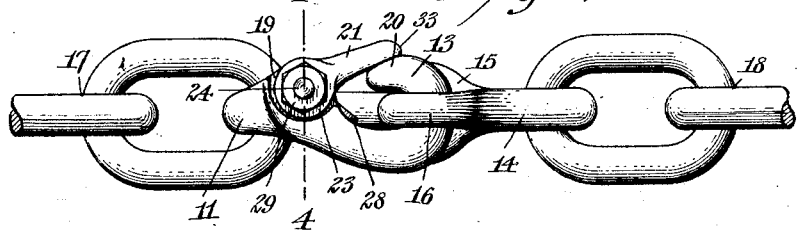
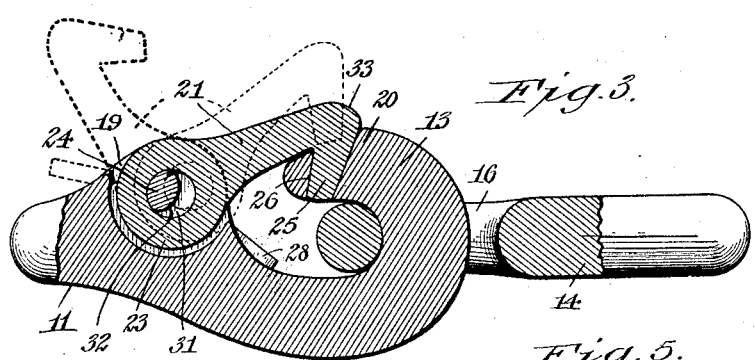
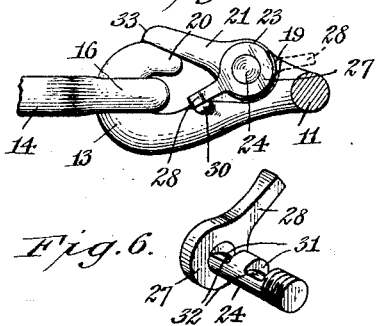
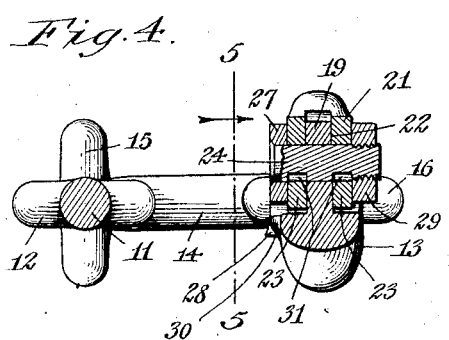
John Clark, Inventor.
By Emil Kuehnert,
Attorney.
Witness
J. J. Oberst, Oct. 16, 1928.

J. CLARK

CONNECTER 1,688,176

Filed July 11, 1927

John Clark, Inventor.
By Emil Neuhart, Attorney.

Witness:
J. J. Oberst.

Patented Oct. 16, 1928.

1,688,176

UNITED STATES PATENT OFFICE.

JOHN CLARK, OF BUFFALO, NEW YORK.

CONNECTER.

Application filed July 11, 1927. Serial No. 204,789.

My invention relates to improvements in connecters for connecting two objects together, such as chains or cables, or for connecting a chain or cable to another object.

This invention is designed to supplant ordinary or standard hooks, swivel hooks, and bolt shackles, usually employed for hoisting, pulling, and other purposes, since the ordinary and the swivel hooks become easily disconnected and cause many serious accidents, and often loss of life, whereas the use of a bolt shackle necessitates the removal of the bolt from the shackle and replacing of the same, which is a tedious and cumbersome operation and oftentimes results in the nut of the bolt becoming loosened and accidental withdrawal of the bolt from the shackle, causing disconnection of the part to be moved, or transported, as the case may be.

The primary object of my invention is the provision of a connecter in the form of a link, swivel, or hook so constructed that accidental disconnection of the parts or objects connected thereby cannot take place, and wherein all abrupt shoulders or projections are dispensed with so as to avoid catching onto any other object.

Another object of my invention, in its preferred form, is to provide a keeper movable in the plane of the part, or more particularly that portion of the part, with which it is adapted for engagement.

A still further object of my invention is to provide means for locking the keeper in retaining position so that accidental movement of the keeper out of retaining position is prevented.

With the above and other objects in view, my invention consists in the novel features of construction and in the arrangement and combination of parts to be hereinafter described and more particularly pointed out in the subjoined claims.

In the drawings:

Fig. 1 is a plan view of adjacent ends of two chains connected together by my improved connecter.

Fig. 2 is a side elevation of the parts shown in Fig. 1.

Fig. 3 is an enlarged longitudinal section taken on line 3—3, Fig. 1.

Fig. 4 is an enlarged transverse section taken on line 4—4, Fig. 2.

Fig. 5 is a section on a reduced scale taken on line 5—5, Fig. 4, looking in the direction of the arrow crossing said line.

Fig. 6 is a detached perspective view of the locking device for the keeper.

Figure 7:
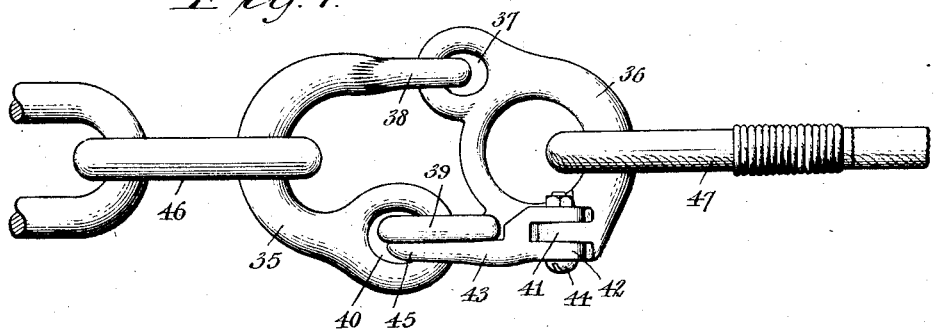
Fig. 7 is a plan view of a modified form of my invention, showing the same connecting adjacent ends of a chain and cable.

In the preferred embodiment of my invention, I have shown the novel features thereof applied to two connected clevises, which together form a link-like connecter, corresponding ends of the two clevises being connected together by means of interlinked eyes while the other ends of said clevises are connected by means of an eye and a hook, the hook being closed by means of my improved keeper and locking mechanism.

In this preferred construction, 11 designates one of the two clevises of the link-like connecter, and it has an eye 12 at one end and a hook 13 at its other end, the eye being at right angles to the hook. The other clevis 14 has an eye 15 at one end at right angles to the eye 12 of the clevis 11, which is interlinked therewith so as to provide a permanent, but loose, flexible connection between the two clevises at corresponding ends thereof. At its other end, said clevis 14 is provided with an eye 16 at right angles to the eye 15, said eye 16 being adapted for connection and disconnection with the hook 13 so that the link formed by the two clevises can be opened for connection thereto of one or more chains, cables, or other lifting or pulling elements.

In the drawings I have shown the end link of a chain 17 hooked over one of the clevises and the end link of another chain 18 hooked over the other clevis of the two-part link, as it may be termed. It will, of course, be apparent that a link, cable, rod, or other similar element may be connected to one of the clevises and when the link-like connecter is opened, attachment may be made through the medium of the other clevis to an object to be lifted, transported or otherwise manipulated.

On the clevis having the hook 13 formed at one end thereof, a lug 19 is formed in line with the end or terminal 20 of the hook and connected with said lug is a keeper 21, which has a bifurcated inner end 22, forming two spaced flat-faced portions 23 lying at opposite sides of said lug 19. The bifurcated inner end of the keeper therefore receives said lug. The bifurcated inner end of said keeper and the lug 19 are provided with registering openings through which a pivot bolt 24 is passed, and by reason of which the keeper is permitted to swing toward and from the outer end or terminal 20 of said hook. The outer end of this keeper is adapted to be swung over the end or terminal of the hook and it has a stud 25 formed on the inner side thereof at its outer end disposed at an acute angle thereto, which is adapted to enter an opening 26 formed in the end or terminal of said hook, said opening being inclined to conform to the disposition of the stud 25 on the keeper. The pivot bolt 24 has a head 27 at its inner end provided with a lateral extension 28 serving as a finger piece, and by means of which the bolt can be rotated within the openings 26 formed through the lug 19 and the bifurcated end of the keeper 21. Said head bears against the inner side of the bifurcated end of the keeper 21 and the outer end of said bolt is screw threaded and has a nut 29 applied thereto which may be tightened by hand sufficiently to prevent accidental rotation of the pivot.

On the hook portion of the clevis 11 a stop lug 30 is formed, against which the finger piece 28 projecting from the head of the pivot bolt is adapted to bear when the outer end of the keeper is locked to the hook. The locking of this keeper is accomplished by the pivot bolt, which has two spaced notches 31 formed therein which are alined with the two spaced flat-faced portions 23 of the keeper. One of said notches is disposed adjacent the head of the bolt. The complete cylindrical formation of the bolt is retained in the region between these notches and this region of the bolt is rotatable in the lug 19. Therefore, when rotating the bolt so that the notches thereof are toward the outer end or terminal of the hook 13, movement of the keeper lengthwise is prevented and at such times the finger piece 28 lies in contact with the stop lug 30. This is the position of the parts when the stud 25 of the keeper is inserted into the opening 26 of the hook and is drawn firmly against that portion of the surrounding wall of said opening nearer the extremity of the hook, thus making it impossible for the stud to become disengaged from said opening and assuring a positive locking of the keeper to the hook.

Upon rotating the pivot 24 so that the notches 31 face away from the outer end or terminal of the hook, or in other words, when facing toward the butt or shank end of the hook, the keeper is permitted to be moved inwardly while swinging in an arc of a circle, having the pivot bolt as a loose center. The extent of forward movement of the keeper is limited only by the depth of the notches 31, and the walls of the openings in said keeper bear against the inner walls of the said notches, which inner walls are made convex, as at 32, the convexity being described from a center having the same radius as the radii of the openings in the keeper so that riding surfaces are provided for the walls of said openings, conforming exactly to the curvature of the walls of said openings.

Viewing Fig. 3 of the drawings, it will be apparent therefore that it is necessary to rotate the pivot bolt through approximately one-half of a complete revolution in order that the necessary play is provided for the movement of the keeper in a forward direction or toward the bight of the hook while swinging the keeper on the pivot bolt so as to permit the withdrawal of the stud 25 from the opening 26 in the end or terminal of the hook. Owing to the reflex angle of said hook and opening, disconnection of the keeper from the terminal of the hook cannot take place when the pivot bolt is so positioned that the notches 31 therein are faced forwardly or toward the bight of the hook; thus assurance is had that any object connected to the hook cannot become accidentally disengaged. Moreover, it is to be noted that the outer end of the keeper is rounded, as at 33, so that no abrupt shoulder is formed for catching onto an object when the device is in service.

While I have shown my invention applied to what may be termed a two-part link, it, however, will be apparent that by serving the hook portion of the device along the line indicated by the numeral 34, Fig. 1, and forming a suitable terminal other than that shown by the remaining portion of the clevis of which the hook forms part, my invention will be embodied in what may be termed a standard type of hook; or, such terminal may be formed to provide a swivel hook, or otherwise.

Figure 8:
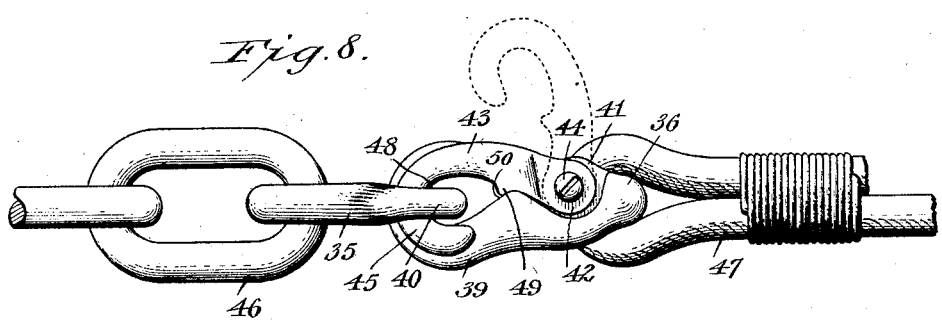
Fig. 8 is a side elevation of the parts shown in Fig. 7.

In the modified form of my invention disclosed in Figs. 7 and 8, I have shown a connecter comprising a clevis 35 and an eye 36, the eye having a smaller eye 37 at one side of its center in the form of an extension thereof interlinked with an eye 38 at one end of the clevis 35. At the opposite side of the eye 36 I provide a hook 39, which is passed through an eye 40 at the other end of said clevis 35. Said hook 39 is reduced in width and on said eye 36 substantially alined with the end portion of said hook 39, a lug 41 is formed which is straddled by the bifurcated end 42 of a keeper 43. A pivot bolt 44 is passed through said lug 41 and the bifurcated inner end of said keeper to pivotally connect the latter to said lug. This keeper includes a hook-shaped terminal 45, which is adapted to swing in contact with the outer side of the hook 39, the hook-shaped terminal 45 being reversely arranged with respect to the hook 39, and when swung against the side of the hook 39, serving to close the latter, as best shown in Fig. 8, thus guarding against accidental disconnection of the clevis 35 connected thereto. The part connected to the clevis 35 and therefore indirectly to the hook 39 and retained by the keeper 43 is shown as the end link of a chain 46, while a cable 47 is fastened to the eye 36. The bight of the hook 39 and that of the hook-like terminal 45 of the keeper 43 are similarly formed so that a smooth riding surface 48 is provided for the eye 40 of the clevis 35, and to assure the registration of these two bights, a stop lug 49 is formed on the inner side of the keeper, which engages the opposed surface 50 formed on the hook 39, as best shown in Fig. 8. It is to be understood that in lieu of the eye 36, a clevis similar to the clevis 35 may be substituted. The combined thickness of the hook 39 and keeper 43 approximates that of an ordinary hook, thus making it possible to reduce the thickness of the hook 39, which nevertheless with the aid of the hook-like terminal of the keeper will provide the necessary strength to withstand all strain to which the device will be subjected. In this modification, all abrupt or sharp edges are eliminated so as to avoid catching against an object during the use of the device.

Preparatory to connecting a link of a chain or other object to the clevis 35, it is necessary to disconnect the eye 40 of said clevis from the hook 39, after which the link or other object may be passed over the end of the clevis thus freed, and the eye 40 again connected with the hook 39. The keeper 43 is then swung downwardly along the side of the hook with the hook-like terminal of the keeper passed through the link or part connected to the hook. To enable the hook-like terminal of the keeper to pass through said eye or other part connected to the hook, said eye or other part is moved rearwardly toward the pivot of the keeper so as to enable the extremity of the latter to pass through the opening of the link or part so connected, which link or part will then be drawn forwardly so as to lie in contact with the bights of both the hook 39 and the keeper 43, the latter by reason of its terminal extending well rearwardly beyond its bight being retained against swinging movement.

Figure 9:
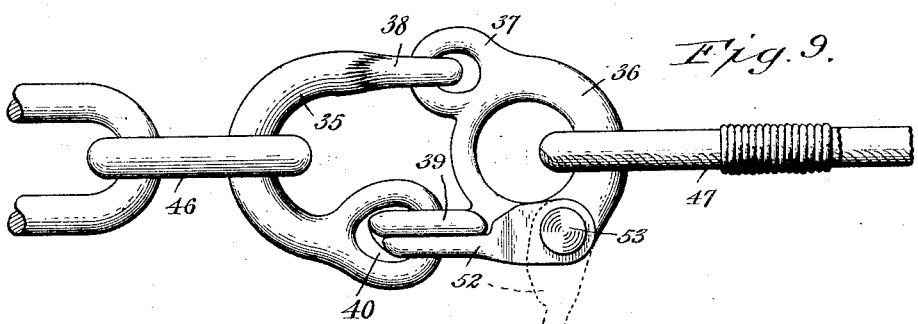
Fig. 9 is a plan view of a still further modified form of my invention showing the same connecting adjacent ends of a chain and cable.
Figure 10:
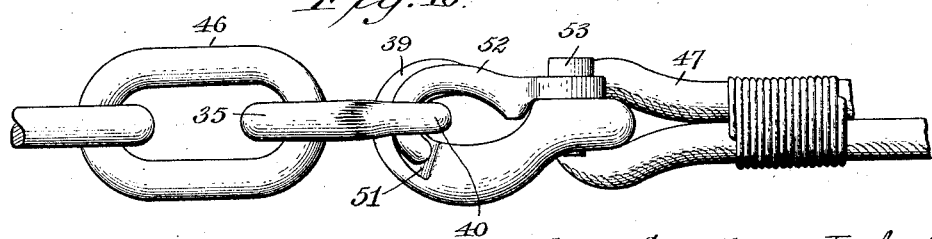
Fig. 10 is a side elevation of the parts shown in Fig. 9.

In the modification shown in Figs. 9 and 10, the clevis 35 shown in Figs. 7 and 8, with its eyes 38 and 40 is employed; also the eye 36 with the extension eye 37 and hook 39. The hook, however, is provided with a cutaway portion 51 at its outer side, and a keeper 52 is provided which is pivotally secured to the eye 36 by a pivot bolt 53 extending through the eye 36 in the plane of the hook 39 so that the keeper 52, in this instance, will swing in a transverse direction to and from the hook 39, against the side of which it lies when in closed position. In this modification the eye 36 has the cable 47 connected thereto, and the end link of a chain 46 is connected to the clevis, as in the construction set out in the modification shown in Figs. 7 and 8.

Having thus described my invention, what I claim is:—

1. A connecter having a hook, a keeper to close said hook, a pivot bolt extending through said keeper and through said hook in rear of the terminal thereof and having a notch formed therein in line with said keeper, said keeper having a reflex stud and the terminal of said hook having an opening to receive said stud, and means to rotate said pivot bolt through a portion of a revolution to bring the notch thereof so as to face toward the terminal of said hook or in an opposite direction.

2. A connecter having a hook provided with a lug in rear of its bight and with an opening in its terminal inclined inwardly and rearwardly away from the bight of said hook, a keeper having a bifurcated rear end straddling said lug and having a stud at its terminal adapted to enter the opening in the terminal of said hook, said stud being inclined to conform to the inclination of said opening, a pivot bolt extending through the bifurcated portion of said keeper and through said lug and having spaced notches in the side thereof alined with the opposite portions of the bifurcated part of said keeper, and means to rotate said pivot bolt through a portion of a revolution so as to face the notches in said pivot bolt toward the bight of said hook or away from the same to respectively lock said keeper to said hook or permit lengthwise and swinging movement of the keeper for disconnection of the terminal of said keeper from the terminal of said hook.

3. A connecter comprising two clevises, corresponding ends of said clevises having interlinked eyes and the other ends of said clevises having means for connecting said other ends together and preventing separation thereof, except under manual manipulation.

4. A connecter comprising two clevises having corresponding ends connected by interlinked eyes and having, respectively, an eye and a hook at their other ends, the hook being passed through said eye and said eye lying in contact with the bight of said hook, a keeper pivotally connected to said hook in rear of the bight thereof and having a reflex stud at its terminal, the terminal of said hook having a correspondingly directed opening therethrough to receive said stud, the pivot of said keeper comprising a pivot bolt embodying in its construction means to prevent withdrawal of said stud from said opening and upon rotation through a portion of a revolution allowing combined lengthwise and swinging movement of said keeper so as to permit the withdrawal of said stud from said opening.

5. A connecter having a hook provided with an opening through its terminal inclined inwardly and rearwardly, a keeper adapted to have its outer end lie against the terminal of said hook and having an inwardly and rearwardly inclined stud adapted to enter said opening, said keeper having its opposite end bifurcated and straddling a portion of said hook, a stop lug formed on said hook, a pivot bolt passed through said hook and said keeper and retained against withdrawal from both, and a finger piece extending laterally from said pivot bolt and adapted to be swung against said stop lug or away from the same so as to rotate said pivot bolt through a portion of a revolution, said pivot bolt having notches alined with the spaced parts of said bifurcated portion to permit said spaced parts to enter said notches, said pivot bolt being positioned so that such notches are directed forwardly when said finger piece is in contact with said stop lug so as to assure the retention of said stud in said opening and the consequent locking of the keeper to the terminal of said hook and being rotatable to direct said notches rearwardly when said finger piece is moved away from said stud, thus providing the necessary play to permit combined lengthwise and swinging movement of said keeper and allow the withdrawal of said stud from said opening.

6. A connecter having a hook, a keeper to close said hook, a pivot bolt extending transversely through said keeper and through said hook in rear of the terminal of the latter and having a notch formed therein in line with said keeper, and means to rotate said pivot bolt through a portion of a revolution to bring the notch thereof so as to face toward the terminal of said hook or in an opposite direction.

7. A connecter having a hook, a keeper to close said hook, the terminals of said hook and said keeper having interlocking means necessitating movement of said keeper lengthwise, and a pivot bolt extending transversely through said keeper and through said hook in rear of the terminal of said hook, said pivot bolt embodying in its construction means to permit lengthwise and swinging movement of said keeper.

In testimony whereof I affix my signature.

JOHN CLARK.